Feb. 8, 1938. H. M. LANG 2,107,672
MAGNETIC HOOKING GAME
Filed June 13, 1936 2 Sheets-Sheet 1
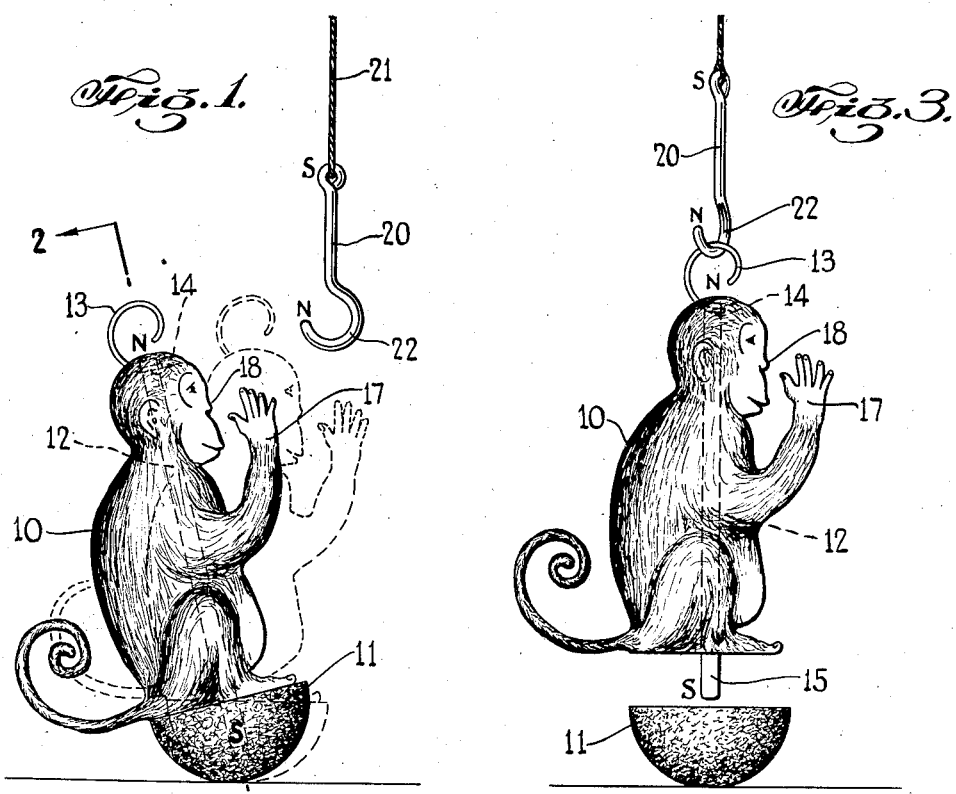
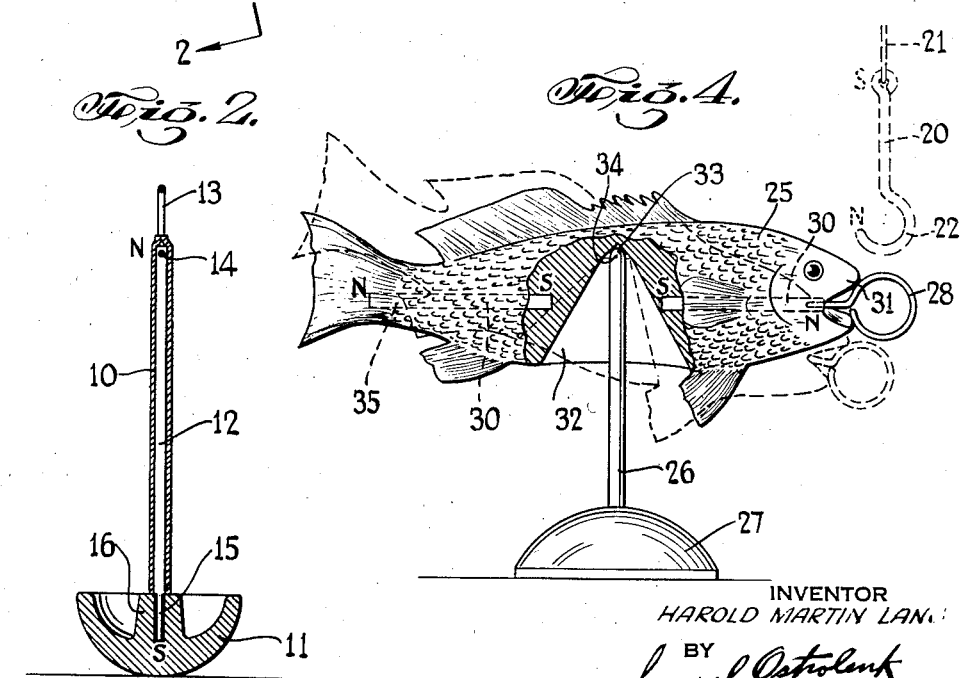
INVENTOR
HAROLD MARTIN LANG
BY
Samuel Ostrolenk
ATTORNEY Feb. 8, 1938. H. M. LANG 2,107,672
MAGNETIC HOOKING GAME
Filed June 13, 1936 2 Sheets-Sheet 2

INVENTOR
HAROLD MARTIN LANG
BY
ATTORNEY

Patented Feb. 8, 1938

2,107,672

UNITED STATES PATENT OFFICE 2,107,672

MAGNETIC HOOKING GAME

Harold M. Lang, New York, N. Y.

Application June 13, 1936, Serial No. 85,004

2 Claims. (Cl. 273—140)

My invention relates to games involving skill in the coordination of hand and eye in capturing a movable object, and more particularly relates to games employing permanent magnets associated with objects which are to be caught by a magnet in the form of a hook and in which the magnetic properties are utilized to increase the difficulty of hooking the objects.

In one modification of my present invention, a slender permanent magnet is secured within a small form of an animal such as a monkey. A brass ring is attached to the top end of the magnet for engagement with a hook. The bottom end of the magnet projects from the animal and is inserted in a hemi-spherical metallic base. The monkey is normally in a vertical position but the hemi-spherical base provides a support of unstable equilibrium for the animal form. The magnetic hook is of the same polarity as the top portion of the magnet within the monkey. In attempting to "hook" the monkey by its protruding brass ring, the like polarity will produce repulsion causing the monkey to rock on its unstable base as the magnet is brought near its head or ring. Skill is required in "hooking" the animal. When caught, the figure plus the magnet is slipped out of its unstable rocking base. Great care is necessary to avoid "flooring" or upsetting the monkey from its upright position.

In another modification of my invention, the animal form is centrally pivoted upon a supporting rod in a manner permitting a rotary as well as rocking movement to the animal form. A magnet is placed within the animal form and a brass ring protrudes from one end of the magnet and the form. An attempt to "hook" the animal by its brass ring causes the animal to gyrate upon its pivotal support by the repellent polarized hook so as to make its capture extremely difficult, to the amusement of spectators and perhaps the consternation of the player.

In a further modification of my present invention, I contemplate placing a number of fish forms, having longitudinal slender magnets within them, in a tank of water. A brass hook or ring protrudes from the mouth of each fish and is secured to one end of the magnet within the fish. Counterweights are used at the tail end of the fish in order that their mouths and brass rings thereat project from the surface of the water. The polarity of the magnet at the mouth end of each fish is made identical, so that a mutual repellent action is encountered by the fish. A magnetic hook of the same polarity as the mouth ends of the fish is used in playing the game. An attempt to hook one fish causes it to rapidly flee from the hook, in a lifelike manner and also change the magnetic equilibrium of the remaining fish which in turn move and re-adjust themselves until they are again disturbed by the hook during the playing of the game.

In order to more clearly set forth my present invention, the following description of particular embodiments thereof is made in connection with the drawings in which:

Figure 1 is an elevation of one modification of my invention showing a monkey form upon a hemi-spherical base for coaction with a magnetic hook.

Figure 2 is a cross sectional view taken through 2—2 of Figure 1 illustrating the magnet and base construction for the monkey form.

Figure 3 is an elevation of the modification of Figure 1 wherein the monkey is "hooked" from its hemi-spherical base.

Figure 4 is another modification of my invention illustrating a fish pivoted upon a rod.

Figure 5:
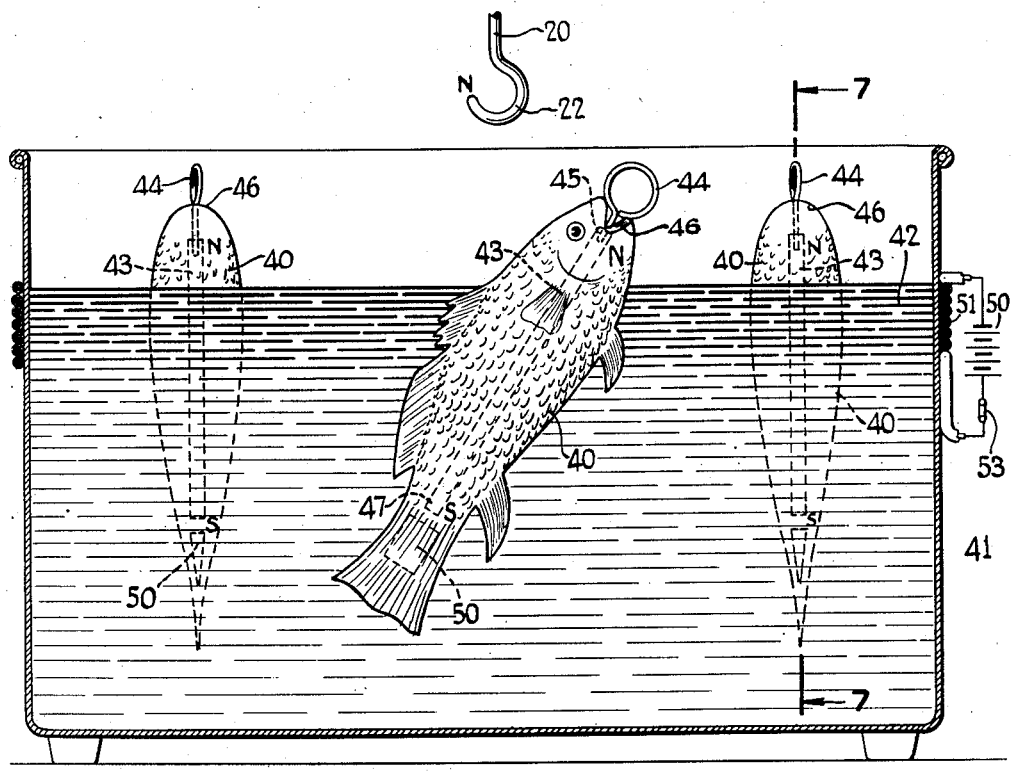
Figures 5 and 6 illustrate a further modification of my invention employing a plurality of fish within tank of water.

Referring to Figure 1, the animal form 10 illustrated as a monkey is mounted upon a metallic hemi-spherical base 11 by means of the slender magnet 12. The monkey form may be of celluloid, brass, molded composition, wood or other suitable non-magnetic material. A preferable non-magnetic ring or loop of wire 13, such as brass, is attached to the top end 14 of magnet 12. The bottom end 15 of magnet 12 is either tapered or made somewhat narrower than the width of magnet 12 to coact with or rest within a cavity in the central portion 16 of the hemi-spherical base 11. Figure 2 illustrates a preferred construction of the base 11, magnet 12 and loop 13. It is to be understood that the animal form 10 is secured to the magnet 12 and envelopes it in any manner familiar to those skilled in the art.

A hook 20 attached to a string 21 is manually controlled by the player of the game. The object of the game is to engage the hook end 22 with the loop 13 on the monkey to unseat or otherwise remove the monkey 10 from its base 11 as illustrated in Figure 3. Hook 20 is made of a permanent magnet, the curved portion 22 of which is of the same polarity as the top portion 14 of the magnet 12. As illustrated in Figures 1 and 3, the polarity of magnet end 14 is north (N) corresponding to the north polarity of the curved portion 22 of hook 20.

As the hook 20 is brought into the vicinity of loop 13 in an attempt to engage it, the like magnetic polarity of magnet end 14 and hook end 22 will cause the monkey to be repelled from the magnet on its rocking unstable base 11. The weight or mass of hook 20 is made comparable with the weight of the monkey form 10 and its magnet 12, so that the repellent force between the magnet ends 14 and 22 will be sufficient to rock the monkey from its vertical position, instead of the monkey 10 repelling the hook 20. If the hook 20 is brought near the loop 13 slowly, the monkey 10 will be tipped from the vertical as illustrated in Figure 1. If the hook 20 is made to follow loop 13, the monkey 10 will be further tipped. If the monkey 10 is tipped beyond a predetermined angle, for example 80° from vertical, it will be "floored" in that it will not return to the vertical position unless reset. One of the rules of the game may be that when the player "floors" the monkey, he is disqualified and the next player takes his turn.

The skill in "hooking" the animal form 10 by its projecting loop 13 resides in taking advantage of the inertia of the form 10. By rapidly approaching the loop 13, the inertia of the unstably poised monkey will permit its being caught if the rapid approach of hook 20 is accurately performed so that the curved end 22 of the hook 20 properly engages with the loop 13. When the hook 20 engages with loop 13 as illustrated in Figure 3, the repellent action of the similarly poled adjacent magnet ends 14 and 22 will not prevent the monkey 10 from being lifted from its base 11 when "caught". The monkey form 10 illustrated in Figures 1 and 3 has its hand poised in front of its nose 18 in a gesture of derision to urge on the players who may easily become exasperated until they develop the skill necessary to capture the monkey.

In Figure 4, another modification of my invention is shown wherein a fish form 25 is pivotally supported on rod 26 secured to base 27. Although I illustrate form 25 as a fish, it will be evident that other forms may equally well be used, such as a bird. Magnet 30 is enclosed centrally within the fish form 25 and a brass ring 28 is attached to the front end of the fish 30. The brass ring 28 projects from the mouth 31 of the fish 25. The polarity of the front end of the magnet 30 is made north to correspond to the same polarity of the hook end 22.

A conical cavity 32 is provided within the form 25. The tip 33 of conical cavity 32 is supported by the rounded top end 34 of pivoted rod 26. The form 25 is designed to be normally balanced in a horizontal position as shown in Figure 4. A metallic bar 35 is used in the rear end of form 25 as a counter-weight to balance the mass of the forward portion thereof.

An attempt to "hook" fish 25 at ring 28 with hook 20 will cause the front portion 21 of the fish 25 to be repelled by the magnet 20 as will now be evident. The fish 25 being pivoted on the tip 34 of rod 26 is movable circularly and also away from the horizontal. The dotted position of Figure 4 illustrates how the fish 25 rocks from the horizontal about its pivotal support. The repulsion of fish 25 is a gyration thereof as a combination of a rocking and circular movement away from the magnetic hook 20.

Angling for the fish 25 by magnetic hook 20 requires a skill developed by constant practice.

The fish 25 in the modification of Figure 4 readily reacts from the proximity of the hook 20. When the curved portion 22 of hook 20 engages the metal ring 28 the fish 25 is "caught" and is readily lifted from its pivotal supporting rod 26.

Figure 5 is a further modification of the magnetic repellent "hooking" game of my present invention. A plurality of fish forms 40 are immersed in a tank 41 containing water 42. The fish 40 have a slender magnetic rod 43 embedded therein. A brass ring 44 is attached to the front end 45 of magnet 43 and projects through the front or mouth portion 46 of fish form 40.

Figure 6:
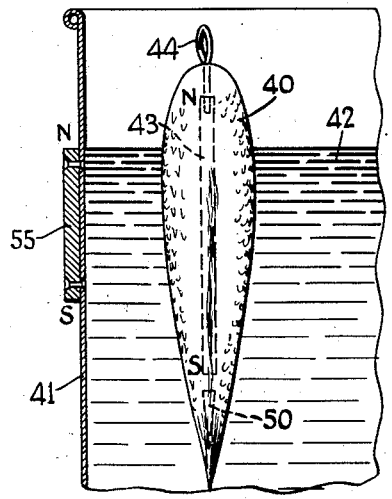
Figure 7:
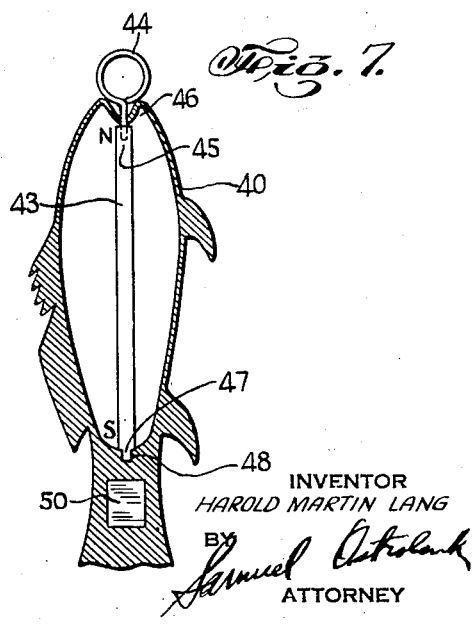
Figure 7 is a cross-sectional view taken along 7—7 of Figure 5 through a fish form.

Figure 7 is a cross-sectional view taken along 7—7 of Figure 6 through a fish 40 illustrating a preferred internal structure thereof. The north (N) end 45 of magnet rod 43 is secured to the forward end 46 of the fish 40 by the metal ring 44 projecting through the mouth of the fish. The opposite end 47 of magnet 43 is preferably tapered or nicked to fit into a suitable groove 48 in the body of the fish 40.

The fish 40 are designed to float partly submerged at the surface of the water 42 in the tank 41. The fish 40 may have a hollow internal construction to facilitate its flotation. A counterweight 50 is embedded at the tail end of the fish 40 so as to hold the fish normally in a vertical position. The central fish of Figure 5 is shown tilted at an angle of about 30° from the vertical. By counterweighting the fish, their mouth portions 46 together with the metallic rings 44 normally project through the surface of the liquid 42 in proper relation for playing of the game.

The internal magnets 43 of the fish 40 are accordingly held in substantially parallel relation. The polarities of the magnets are all arranged similarly, in that for example the ends 45 adjacent the mouths 46 of the fish are of north (N) polarity and the opposite ends 47 are of south (S) polarity. The fish will therefore normally repel each other and arrange themselves in a spaced equilibrium relation about the surface of the water 42 in the tank 41.

The magnetized hook 20 is manually operated by the player to catch a fish 40 in the tank at its protruding brass ring 44. The loop 22 of the hook 20 is made of the same polarity as the forward ends 45 of the magnets 43 within the fish 40. By bringing the magnetized hook 20 in the vicinity of any one fish, the magnetic repelling action of the like polarities will cause the fish to dart away. The lifelike action of the fish "swimming" away from the fishhook 20 disturbs the magnetic equilibrium of the darting fish with respect to the other fish in the tank. A general movement of the fish accordingly occurs away from the region of the hook, adding to the merriment (or discomfiture) of the players.

When the fish 40 once reach a side of the tank, they have a tendency to remain there due to the surface tension of the water, thereby decreasing the difficulty of catching them with the hook 20. This difficulty is overcome by the provision of a solenoid 51 comprising a few turns of insulated wire wound about the tank 41 at a level corresponding to the surface of the water 42 within the tank. The solenoid 51 is connected to a direct current source and a switch 53. The polarity of the solenoid 51 is made so that its axial magnetic field will be of the same polarity as the direction of the magnetic field emanating from the individual bar magnets 43 within the fish 40.

A weak current flowing through the solenoid 51 will provide a magnetic field which is quite strong near the adjacent surface of the water 42 and is negligible at even a small distance away from the sides of the tank 41. The material of the tank 41 is non-magnetic such as brass, glass, composition or the like to permit the penetration of the magnetic field from the solenoid 51. It will be evident that the solenoid 51 may be attached to the internal sides of the tank 41 instead of to the exterior portion as illustrated. The provision of the magnetic field by solenoid 51 overcomes any tendency of the fish 40 to float against or remain at the side of the tank 41, and does not interfere with the normal action of the fish during the progress of the game.

A modification of the surface tension repelling means is illustrated in Figure 6. A plurality of bar magnets 55 is attached to the sides of the tank 41 at the level of the water 42. The plurality of the magnets 55 are arranged similar to that of the magnets 43 within the fish 40. The fish 40 will accordingly be repelled away from the sides of the tank to prevent getting "stuck" thereat. The bar magnets 55 may be attached to the interior side of the tank instead of the exterior position as shown in Figure 6.

Although I have illustrated some of the physical embodiments which my invention may assume, it will be evident that other shapes and embodiments than those disclosed may be employed within the spirit of my invention. Thus I may arrange a toy device which floats submerged as a submarine and would give to the game the added zest of dredging or salvaging sunken treasures. Thus I do not wish to be limited by my illustration except as set forth in the following claims.

I claim:

1. In a game of the character described, a body in the form of a figure; a bar magnet secured within said body; means for supporting said body mounted for universal rocking movement in stable equilibrium comprising a hemispherical base detachable from said body; a loop attached to the end of said magnet and protruding from said body; and a magnetic hook having the curved end portion of the same polarity as the end of said magnet attached to said loop, manually controlled for engagement with said loop, whereby the proximity of said hook with said loop acts to unbalance the equilibrium position of said body.

2. In a game of the character described, a body in the form of a figure; a bar magnet secured within said body; means for supporting said body mounted for universal rocking movement in stable equilibrium comprising a base detachable from said body; a loop attached to the end of said magnet and protruding from said body; and a magnetic hook having the curved end portion of the same polarity as the end of said magnet attached to said loop, manually controlled for engagement with said loop, whereby the proximity of said hook with said loop acts to unbalance the equilibrium position of said body.

HAROLD M. LANG.